United States Patent
Ito

[11] Patent Number: 5,317,421
[45] Date of Patent: May 31, 1994

[54] WHITE REFERENCE DATA GENERATING UNIT APPLIED TO SHADING CORRECTION SYSTEM

[75] Inventor: Masaaki Ito, Yokohama, Japan

[73] Assignee: Ricoh Company, Ltd., Tokyo, Japan

[21] Appl. No.: 816,671

[22] Filed: Jan. 3, 1992

[30] Foreign Application Priority Data

Jan. 8, 1991 [JP] Japan .................. 3-011522
Jan. 8, 1991 [JP] Japan .................. 3-011551
Sep. 30, 1991 [JP] Japan .................. 3-276291

[51] Int. Cl.$^5$ ............................. H04N 1/04
[52] U.S. Cl. ................. 358/464; 358/461; 358/462
[58] Field of Search ......... 358/448, 461, 462, 464, 358/465, 163; 382/52, 53; H04N 1/38, 1/40

[56] References Cited

U.S. PATENT DOCUMENTS

4,783,836 11/1988 Takashima ............... 358/163
5,062,144 10/1991 Murakami ............... 358/464
5,099,341 3/1992 Nosaki et al. ............ 358/461
5,146,351 9/1992 Maehara ................. 358/461

FOREIGN PATENT DOCUMENTS

62-189871 8/1987 Japan .
2111165 4/1990 Japan .

Primary Examiner—Edward L. Coles, Sr.
Assistant Examiner—Kim Yen Vu
Attorney, Agent, or Firm—Oblon, Spivak, McClelland, Maier & Neustadt

[57] ABSTRACT

A white reference data generating unit which generates white reference data used in a shading correction process includes a line memory for storing white reference data, a determination circuit for determining whether or not the image data supplied from an image sensor is equal to or less than a predetermined threshold level, a updating circuit for updating the white reference data stored in the line memory to new white reference data calculated based on the white reference data stored in the line memory and input data while each line on a white reference plate is scanned, and a selector for supplying the image data, as the input data, to the updating circuit when the determination circuit determines that the image data is greater than the threshold level, and for supplying difference data, as the input data, to the updating circuit when the determination circuit determines that the image data is equal to or less than the threshold level, the difference data being obtained by subtracting a predetermined value from the white reference data stored in the line memory.

19 Claims, 4 Drawing Sheets

WHITE REFERENCE DATA GENERATING UNIT APPLIED TO SHADING CORRECTION SYSTEM

BACKGROUND OF THE INVENTION (1) Field of the Invention

The present invention generally relates to a white reference data generating unit applied to a shading correction system, and more particularly to a white reference data generating unit applied to a shading correction system which is provided in an optical reader used in digital copy machines, facsimile machines and the like.

(2) Description of Related Art

In an optical reading apparatus used in facsimile machines, digital copy machines and the like, a line sensor such as a CCD (Charge-Coupled Device) sensor optically scans a document so that an image formed on the document is read. This type of line sensor generally has thousands of photosensitive elements. Thus, an image for one line is divided into thousands of pixels, and then the line sensor outputs an image signal having levels corresponding to densities of respective pixels.

In the optical reader, there are an intensity variation of a light irradiating the document, a variation of luminous intensity distribution in a optical system, a sensitivity variation of respective photosensitive elements of the line sensor and the like. Due to the above various variations, there is a case where levels of the image signal corresponding to pixels having the same density differ from each other. To eliminate this problem, a shading correction process is carried out in the optical reading apparatus.

In the shading correction process, white reference data corresponding to each of the photosensitive elements (the pixels) is generated based on the image signal output from the line sensor when the line sensor scans a white reference plate having a uniform white density before scanning the document. When the document is scanned by the line sensor, image data for each pixel obtained based on the image signal output from the line sensor is corrected by use of corresponding white reference data which has been obtained as described above. That is, a ratio of a level of the image signal corresponding to each pixel to the corresponding white reference data is used as the image data for each pixel.

The white reference data for each pixel is obtained by scanning the white reference plate. Thus, if the line sensor scans the white reference plate in a condition in which dust is adhered to the white reference plate, the white reference data corresponding to each pixel on an area to which the dust is adhered is damaged. If the shading correction is carried out based on the white reference data which is damaged by the dust, a white line is formed at a position of each pixel corresponding to the damaged white reference data on an image reproduced based on the image data.

Conventionally, to prevent the white line from forming on the reproduced image, a white reference data generating unit disclosed in Japanese Patent Laid Open Publication No-62-189871 has been proposed. In this conventional white reference data generating unit, a maximum level of levels of the image signals, corresponding to each pixel, obtained by scanning the white reference plate for a plurality of lines is defined as the white reference data for each pixel. According to the conventional white reference generating unit, as the maximum level of the image signal obtained by scanning the white reference plate is used as the white reference data, the white line can be prevented from forming on the reproduced image.

However, as various noises are included in the image signal output from the line sensor, when the level of the image signal instantly increases caused by a noise at a time of scanning the white reference plate, an accurate white reference data cannot be obtained. In this case, a good shading correction cannot be carried out.

SUMMARY OF THE PRESENT INVENTION

Accordingly, a general object of the present invention is to provide a novel and useful white reference data generating unit applied to a shading correction system in which the disadvantages of the aforementioned prior art are eliminated.

A more specific object of the present invention is to provide a white reference data generating unit applied to a shading correction system in which accurate white reference data can be obtained even if the image signal is instantly varied due to noises and the dust is adhered to the white reference plate.

The above objects of the present invention are achieved by a white reference data generating unit for generating white reference data based on image data which is obtained while image sensor means is scanning on a white reference plate in a predetermined number of lines, the white reference data being used in a shading correction process, the white reference data generating unit comprising: storage means for storing white reference data; determination means, coupled to the image sensor means, for determining whether or not the image data supplied from the image sensor means is equal to or less than a predetermined threshold level; updating means, coupled to the storage means, for updating the white reference data stored in the storage means to new white reference data calculated based on the white reference data stored in the storage means and input data while the image sensor means is scanning each line on the white reference plate; and supply means, coupled to the storage means, the determination means and the updating means, for supplying the image data, as the input data, to the updating means when the determination means determines that the image data is greater than the threshold level, and for supplying difference data, as the input data, to the updating means when the determination means determines that the image data is equal to or less than the threshold level, the difference data being obtained by subtracting a first value from the white reference data stored in the storage means.

The above objects are also achieved by a white reference data generating unit for generating white reference data based on image data which is obtained while image sensor means is scanning on a white reference plate in a predetermined number of lines, the white reference data being used in a shading correction process, the white reference data generating unit comprising: storage means for storing white reference data; determination means, coupled to the image sensor means, for determining whether or not the image data supplied from the image sensor means is equal to or less than a predetermined threshold level; updating means, coupled to the storage means and the image sensor means, for updating the white reference data stored in the storage means to new white reference data calculated based on the white reference data stored in the storage means and the image data supplied from the image sensor means while the image sensor means is scanning each line on the white reference plate; and inhibition means, coupled to the determination means and the updating means, for inhibiting the updating means from updating the white reference data stored in the storage means when the determination means determines that the image data supplied from the image sensor means is equal to or less than the threshold level.

According to the present invention, when the image data is equal to or less than the predetermined threshold level, the white reference data stored in the storage means is updated based on the difference data obtained by subtracting a predetermined value from the white reference data stored in the storage means. In addition, when image data is equal to or less than the predetermined threshold level, the white reference data is prevented from being updating. Thus, the accurate white reference data can be obtained.

Additional objects, features and advantages of the present invention will become apparent from the following detailed description when read in conjunction with the accompanying drawings.

DESCRIPTION OF THE PREFERRED EMBODIMENTS

A description will now be given of a first embodiment of the present invention with reference to FIGS. 1 through 3.

Figure 1:
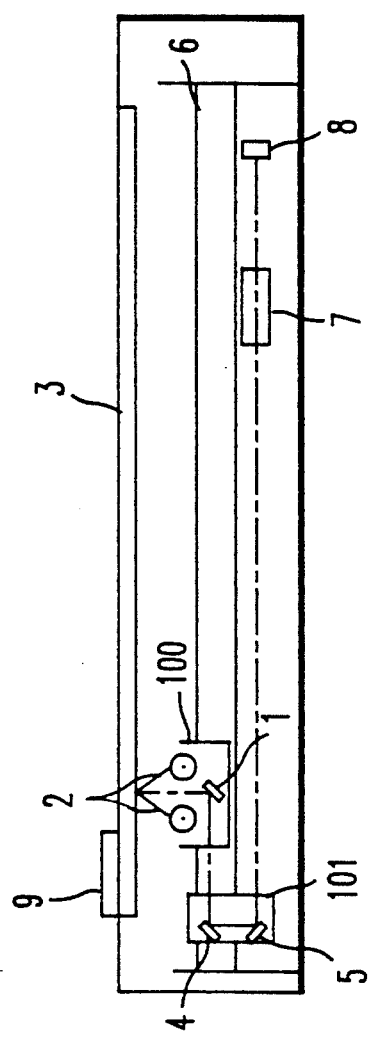
FIG. 1 is a diagram illustrating an example of a structure of an optical reader.

Referring to FIG. 1, which shows a structure of an optical reader, the optical reader has a reflection mirror 1, a fluorescent lamp 2, a platen glass 3, reflection mirrors 4 and 5, a guardrail 6, an optical lens system 7, a line sensor 8 formed of a CCD, and a white reference plate 9. The fluorescent lamp 2 and the reflection mirror 1 are mounted in a first carriage 100. The reflection mirrors 4 and 5 are mounted in a second carriage 101. The first and second carriage 100 and 101 are capable of moving along the guardrail 6 under the platen glass 3. A document is set on the platen glass 3 so that a surface thereof on which images are formed is in contact with the platen glass 3. When the fluorescent lamp 2 irradiates the document on the platen glass 3, a light reflected by the surface of the document passes through an optical path extending to the line sensor 8 via the reflection mirrors 1, 4 and 5 and the optical lens system 7, so that a line of the document images on the line sensor 8. The line sensor scans the line of the document in this state so that a main-scanning is carried out. When the first and second carriage 100 and 101 are moved by a driving motor along the guardrail 6 in a state where the fluorescent lamp 2 irradiates the document, the line of the document imaged on the line sensor 8 varies. That is, the line sensor 8 scans a plurality of lines of the document, so that a sub-scanning is carried out.

Before the document set on the platen glass 3 is scanned by the line sensor 8 as described above, the white reference plate 9 is scanned by the line sensor 8 in the same manner as the document. White reference data is generated based on an image signal which is output from the line sensor 8 while scanning the white reference plate 9. The white reference data is used in a shading correction process which is carried out when the line sensor 8 scans the document, so that the variation of luminous intensity in optical parts, such as the reflection mirrors 1, 4 and 5, the fluorescent lamp 2, and the optical lens system, and the sensitivity variation of respective photosensitive elements in the line sensor 8 are prevented from affecting the image data obtained by the optical reader.

The white reference plate 9 is formed of a material having uniform density or a plate uniformly painted white.

Figure 2:
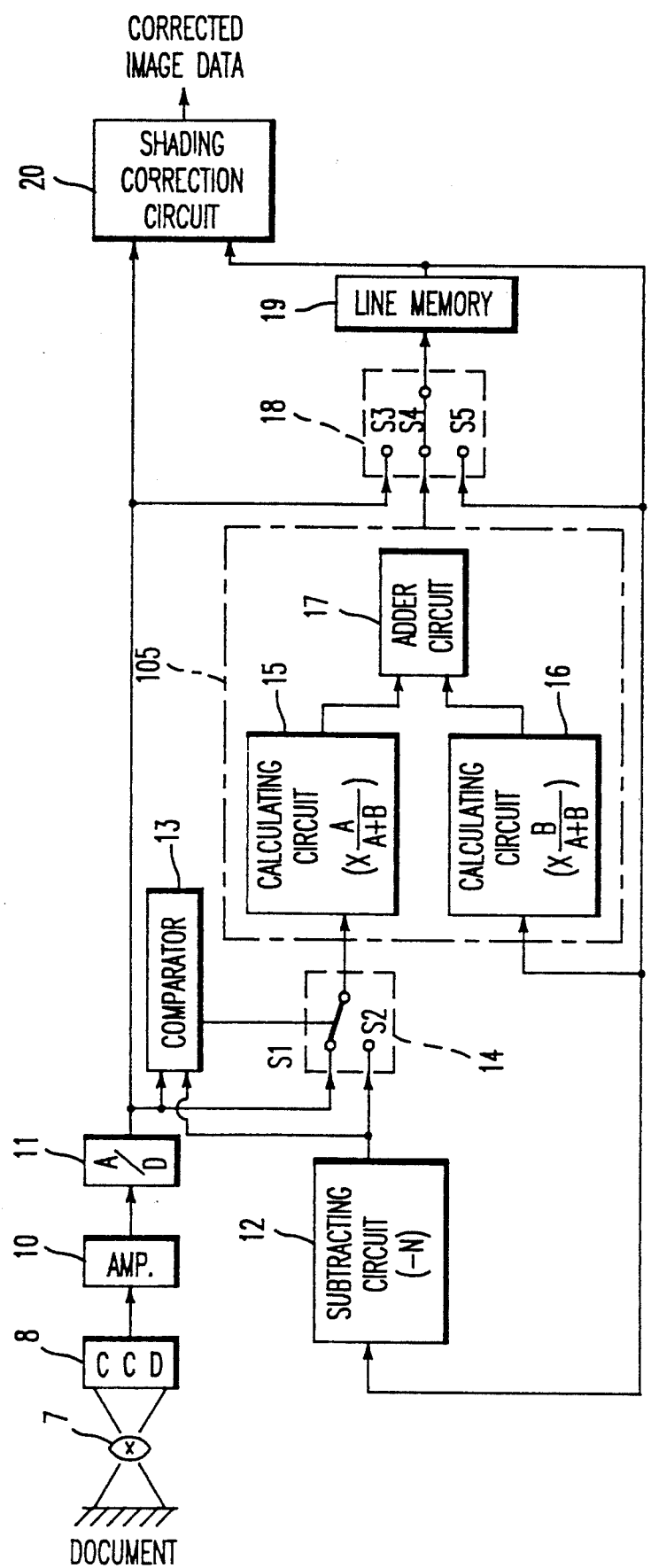
FIG. 2 is a block diagram illustrating a white reference data generating unit according to a first embodiment of the present invention.
Figure 3:
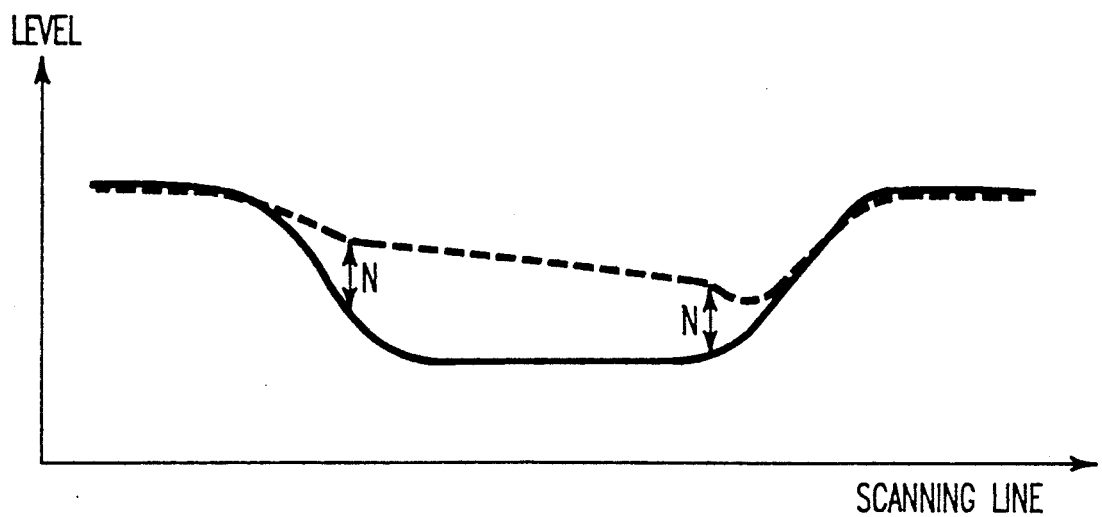
FIG. 3 is a diagram illustrating variations of the white reference data generated by the unit shown in FIG. 2 and a level of the image signal obtained at a time of scanning a white reference plate.

FIG. 2 shows a white reference data generating unit. Referring to FIG. 2, an image signal output from the line sensor 8 on which the light reflected by the document is projected via the optical lens system 7 is supplied to an amplifier 10. The amplifier 10 amplifies the image signal. The amplifier 10 is coupled to an analog-to-digital converter 11 so that the image signal supplied via the amplifier 10 is converted into digital image data. An output port of the analog-to-digital converter 11 is connected to a comparator 13 and a first port $S_1$ of a first switching circuit 14. The first switching circuit 14 selects either the first port $S_1$ or a second port $S_2$. An output of the first switching circuit 14 is coupled to an operating circuit 105. The operating circuit 105 has a first calculating circuit 15, a second calculating circuit 16 and an adder circuit 17. Output data from the first switching circuit 14 is supplied to the calculating circuit 15. The first calculating circuit 15 multiplies input data by $A/(A+B)$, and the second calculating circuit 16 multiplies input data by $B/(A+B)$, where A and B are predetermined constants. The output data from both the first and second calculating circuits 15 and 16 are added by the adder circuit 17. A second switching circuit 18 has a first port $S_3$, a second port $S_4$ and third port $S_5$. The output of the adder circuit 17 of the operating circuit 105 is connected to the second port $S_4$ of the second switching circuit 18. The second switching circuit 18 is coupled to a line memory 19 so that image data supplied via the second switching circuit 18 is stored in the line memory 19 line by line. An output of the line memory 19 is coupled to a subtracting circuit 12, the second calculating circuit 16 of the operating circuit 105 and the third port $S_5$ of the second switching circuit 18. The subtracting circuit 12 subtracts a threshold value N from the image data supplied from the line memory 19 for every pixel. Output data of the subtracting circuit 12 is supplied to the comparator 13 and second port $S_2$ of the first switching circuit 14. The comparator 13 compares the image data output from the analog-to-digital converter 11 with the data output from the subtracting circuit 12. When the image data is equal to or greater than the data from the subtracting circuit 12, the comparator 13 outputs a first control signal. When the image data is less than the data from the subtracting circuit 12, the comparator 13 outputs a second control signal. The first switching circuit 14 selects the first port $S_1$ when the first control signal is supplied from the comparator 13, and selects the second port $S_2$ when the second control signal is supplied from the comparator 13. The data stored in the line memory 19 is supplied, as white reference data, to a shading correction circuit 20. The shading correction circuit 20 carries out the shading correction process so that the image data supplied from the analog-to-digital converter 11 is corrected based on the white reference data. Thus the shading correction circuit 20 outputs corrected image data.

One operation for reading the document includes three steps; a pre-processing step, a white reference reading step, and a document reading step. In the pre-processing step, a part in front of the white reference plate 9 is scanned under a condition in which the second switching circuit 18 selects the first port $S_3$. In this case, the image data output from the analog-to-digital converter 11 is supplied to the line memory 19 via the second switching circuit 18. In the white reference reading step, the white reference plate 9 is scanned under a condition in which the second switching circuit 18 selects the second port $S_4$. In this case, the image data output from the operating circuit 105 is supplied, as the white reference data, to the line memory 19 via the second switching circuit 18. The white reference generating circuit operates as follows while the white reference plate 9 is being scanned for a predetermined number of lines in the white reference reading step.

When a first line on the white reference plate 9 is scanned, the image data output from the analog-to-digital converter 11 passes through the first switching circuit 14, the operating circuit 105 and the second switching circuit 18, and is stored, as the white reference data, in the line memory 19 as it is. After this, when an n-th line on the white reference plate 9 is scanned, the image data $a_{1,n}, a_{2,n}, \ldots,$ and $a_{j,n}$ on n-th line are successively output from the analog-to-digital converter 11. At this time, the white reference data $D_{1,n-1}, D_{2,n-1}, \ldots,$ and $D_{j,n-1}$ for the (n−1)-th line which have been previously stored in the line memory 19 are successively supplied from the line memory 19 to the second calculating circuit 16 and the subtracting circuit 12. The subtracting circuit 12 outputs difference data $(D_{k,n-1}-N)$ for every pixel on the n-th line $(k=1,2,\ldots,j)$. The comparator 13 compares the image data $a_{k,n}$ for the k-th pixel on n-th line and the difference data $(D_{k,n-n}-N)$ for a corresponding pixel on the n-th line with each other. When the image data $a_{k,n}$ is equal to or greater than the difference data $(D_{k,n-1}-N)$, the first switching circuit 14 selects the first port $S_1$ due to the first control signal supplied from the comparator 13 so that the image data $a_{k,n}$ for the k-th pixel on the n-th line is supplied to the calculating circuit 15 of the operating circuit 105. Thus, the operating circuit 105 outputs the following new white reference data $D_{k,n}$ for the k-th pixel on the n-th line.

$$D_{k,n}=1/(A+B) [A \cdot a_{k,n}+B \cdot D_{k,n-1}] \quad (1)$$

$(k=1, 2, \ldots, j)$

The new white reference data $D_{k,n}$ output from the operating circuit 105 is supplied to the line memory 19 so that the white reference data $D_{k,n-1}$ for the k-th pixel on the (n−1)-th line stored in the line memory 19 is updated to the new white reference data $D_{k,n}$ calculated in accordance with the formula (1).

In this case, the operation circuit 105 carries out a weighted average calculation of the image data $a_{k,n}$ for the k-th pixel on the n-th line and the white reference data $D_{k,n-1}$ for the k-th pixel on the (n−1)-th line, so that new white reference data $D_{k,n}$ for the k-th pixel on the n-th line is obtained.

On the other hand, when the image data $a_{k,n}$ for the k-th pixel on the n-th line is less than the difference data $(D_{k,n-1}-N)$, the first switching circuit 14 selects the second port $S_2$ due to the second control signal supplied from the comparator 13 so that the difference data $(D_{k,n-1}-N)$ for the k-th pixel on the n-th line is supplied to the first calculating circuit 15. In this case, the operating circuit 105 outputs the following white reference data $D_{k,n}$ for the k-th pixel on the n-th line.

$$D_{k,n}=D_{k,n-1}-A \cdot N/(A+B) \quad (2)$$

$(k=1, 2, \ldots, j)$

The new white reference data $D_{k,n}$ for the k-th pixel on the n-th line calculated in accordance with the formula (2) is supplied from the operating circuit 105 to the line memory 19 so that the white reference data $D_{nk,n-1}$ for the k-th pixel on the (n−1)-th line is updated.

In this case, although the level of the image data greatly decreases, the new white reference data decreases by only $A \cdot N/(A+B)$.

A description will now be given of a calculation example in a case where $A=1$, $B=3$ and $N=4$.

In a state where the white reference data $D_{k,n-1}$ for the k-th pixel on (n−1)-th line stored in the line memory 19 is equal to 200, when the image data $a_{k,n}$ for the k-th pixel on the n-th line rapidly decreases to 150 due to the dust adhered to the white reference plate 9, the new white reference data $D_{k,n}$ for the k-th pixel on the n-th line is calculated in accordance with the formula (2) as the image data $a_{k,n}$ $(=150)$ is less than the difference data $(D_{k,n-1}-N=200-4=196)$. Thus, the following new white reference data $D_{k,n}$ is obtained.

$$D_{k,n}=[200 \times 3/(1+3)]+[(200-4) \times 1/(1+3)]=199$$

In this case, although the difference between the image data and the previous white reference data is equal to 50 $(200-150)$, the difference between the new white reference data and the previous one is equal to only 1 $(200-199)$.

The white reference data stored in the line memory 19 is updated in accordance with the above formula (1) or (2). When the predetermined number of lines on the white reference plate 9 has been completely scanned, the white reference reading step is finished. The white reference data finally stored in the line memory 19 in the white reference reading step is used in the shading correction process.

When a scanning line reaches a leading end of the document after the white reference reading step, the document reading step starts. In the document reading step, the second switching circuit 18 selects the third port $S_5$. While the document is being scanned, the image data for every pixel is supplied from the analog-to-digital converter 11 to the shading correction circuit 20. At this time, the white reference data for a corresponding pixel is supplied from the line memory 19 to the shading correction circuit 20. The shading correction circuit 20 caries out the shading correction process in which the image data is corrected based on the white reference data. Thus the shading correction circuit 20 outputs the corrected image data for every pixel. The white reference data for every pixel is fed back to the line memory 19 via the second switching circuit 18, so that the white reference data does not vary in the document reading step.

In the first embodiment, the line memory 19 can be formed of a FIFO (First-in First-out) memory or a random access memory (RAM). In a case where the line memory 19 is formed of the RAM, two memory areas are alternately used as a memory for reading out data or a memory for writing data line by line.

According to the first embodiment, as the white reference data is updated in accordance with the weighted average calculation using the image data on the n-th line and the white reference data obtained on the (n−1)-th line, the white reference data is hardly affected by noises such as random noises. In addition, although the image data on the n-th line greatly decreases from the white reference data on the (n−1)-th line, the updated white reference data on n-th line decreases by only a predetermined level. Thus, the white reference data is prevented from greatly decreasing, as shown by a dotted line in FIG. 3, even if the image data greatly decreases, as shown by a continuous line in FIG. 3, due to the dust adhered to the white reference plate 9.

Figure 5:
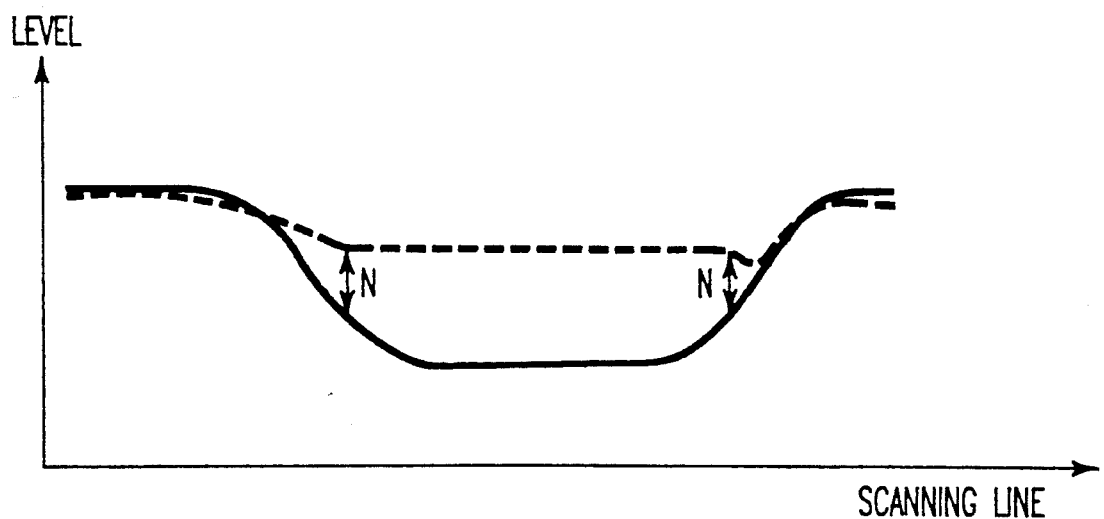
FIG. 5 is a diagram illustrating variations of the white reference data generated by the unit shown in FIG. 4 and a level of the image signal obtained at a time of scanning the white reference plate.
Figure 4:
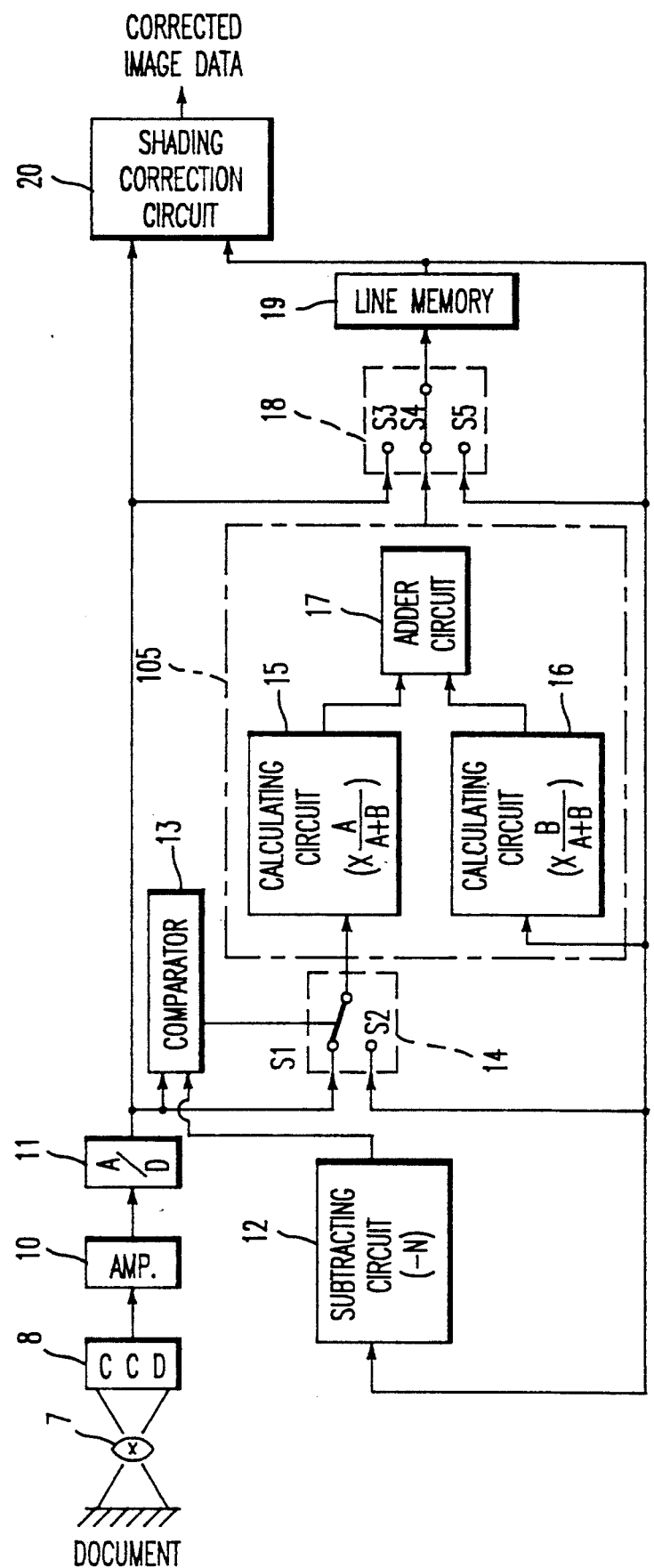
FIG. 4 is a block diagram illustrating a white reference data generating unit according to a second embodiment of the present invention.

A description will now be given of a second embodiment of the present invention with reference to FIGS. 4 and 5. In FIG. 4, those parts which are the same as those shown in FIG. 1 are given the same reference numbers.

In FIG. 4, the second port S₂ of the first switching circuit 14 is connected to the line memory 19 instead of the subtracting circuit 12 shown in FIG. 1.

In this second embodiment, when the image data $a_{k,n}$ for the k-th pixel on the n-th line is equal to or greater than the difference data ($D_{k,n-1}-N$), the white reference data stored in the line memory 19 is updated in accordance with the formula (1), in the same manner as that in the first embodiment. On the other hand, when the image data $a_{k,n}$ for the k-th pixel on the n-th line is less than the difference data ($D_{k,n-1}-N$), the white reference data $D_{k,n-1}$ for the k-th pixel on the (n−1)-th line is supplied to both the first and second calculating circuits 15 and 16. Thus, the new white reference data $D_{k,n}$ is calculated by the following formula (3)

$$D_{k,n}=D_{k,n-1} \qquad (3)$$

That is, the white reference data does not vary.

In a case where N=10, when the density of the white reference plate 9 varies from 0.0 to 0.1 so that the image data output from the analog-to-digital converter 11 varies from 200 to 159, the white reference data is maintained at 200.

According to the second embodiment, although the image data on the n-th line greatly decreases from the white reference data on the (n−1)-th line, the new white reference data on n-th line is equal to the previous white reference data on the (n−1)-th line. Thus, the white reference data is prevented from greatly decreasing, as shown by a dotted line in FIG. 5, even if the image data greatly decreases, as shown by a continuous line in FIG. 5, due to the dust adhered to the white reference plate 9.

The present invention is not limited to the aforementioned embodiments, and variations and modifications may be made without departing from the scope of the claimed invention.

What is claimed is:

1. A white reference data generating unit for generating white reference data based on image data which is obtained while an image sensor means is scanning on a white reference plate in a predetermined number of lines, said white reference data being used in a shading correction process, said white reference data generating unit comprising:

storage means for storing the white reference data;

determination means, coupled to said image sensor means, for determining whether or not the image data supplied from said image sensor means is equal to or less than a threshold level based on data stored as the white reference data in said storage means;

updating means, coupled to said storage means, for updating the white reference data stored in said storage means to new white reference data calculated based on the white reference data stored in said storage means and input data while said image sensor means is scanning each line on said white reference plate; and supply means, coupled to said storage means, said determination means and said updating means, for supplying the image data, as the input data, to said updating means when said determination means determines that the image data is greater than the threshold level, and for supplying difference data, as the input data, to said updating means when said determination means determines that the image data is equal to or less than the threshold level, said difference data being obtained by subtracting a first value form the white reference data stored in said storage means.

2. A white reference data generating unit as claimed in claim 1, wherein said threshold level used in said determination means is a level less than the white reference data stored in said storage means by a second value.

3. A white reference data generating unit as claimed in claim 2 further comprising subtraction means for subtracting the second value from said white reference data stored in said storage means, wherein a result obtained by said subtraction means is used as said threshold level.

4. A white reference data generating unit as claimed in claim 2, wherein the second value is equal to the first value used for obtaining the difference data.

5. A white reference data generating unit as claimed in claim 3, wherein the second value is equal to the first value used for obtained the difference data, so that the result obtained by said subtraction means is also used as the difference data.

6. A white reference data generating unit as claimed in claim 1, wherein updating means has operating means for calculating a weighted average of the white reference data stored in said storage means and the input data, and wherein a result obtained by said operating means is used as the new white reference data.

7. A white reference data generating unit as claimed in claim 6, wherein said operating means has first calculating means for multiplying the input data by A/(A+B), second calculating means for multiplying the white reference data by B/(A+B), and third calculating means for adding a first result obtained by said first calculating means and a second result obtained by said second calculating means, where A and B are predetermined constants, a result obtained by said third calculating means being used as the weighted average of the white reference data stored in said storage means and the input data.

8. A white reference data generating unit as claimed in claim 1, wherein said supply means has switching means for selecting a first port when said determination means determines that the image data is greater than the threshold level and for selecting a second port when said determination means determines that the image data is equal to or less than the threshold level, said first port coupling the image data to said updating means, and said second port coupling the difference data to said updating means.

9. A white reference data generating unit as claimed in claim 1, wherein said storage means has a line memory storing the white reference data by one line.

10. A white reference data generating unit for generating white reference data based on image data which is obtained while an image sensor means is scanning on a white reference plate in a predetermined number of lines, said white reference data being used in a shading correction process, said white reference data generating unit comprising:

storage means for storing the white reference data;

determination means, coupled to said image sensor means, for determining whether or not the image data supplied from said image sensor means is equal to or less than a threshold level based on data stored as the white reference data in said storage means;

updating means, coupled to said storage means and said image sensor means, for updating the white reference data stored in said storage means to new white reference data calculated based on the white reference data stored in said storage means and the image data supplied from said image sensor means while said image sensor means is scanning each line on said white reference plate; and inhibition means, coupled to said determination means and said updating means, for inhibiting said updating means from updating the white reference data stored in said storage means when said determination means determines that the image data supplied from said image sensor means is equal to or less than the threshold level.

11. A white reference data generating unit as claimed in claim 10, wherein said threshold level used in said determination means is a level less than the white reference data stored in said storage means by a predetermined value.

12. A white reference data generating unit as claimed in claim 11 further comprising subtraction means for subtracting the predetermined value from said white reference data stored in said storage means, wherein a result obtained by said subtraction means is used as said threshold level.

13. A white reference data generating unit as claimed in claim 10, wherein updating means has operating means for calculating a weighted average of the white reference data stored in said storage means and the image data supplied from said image sensor means, and wherein a result obtained by said operating means is used as the new white reference data.

14. A white reference data generating unit as claimed in claim 13, wherein said operating means has first calculating means for multiplying the image data by $A/(A+B)$, second calculating means for multiplying the white reference data by $B/(A+B)$, and third calculating means for adding a first result obtained by said fist calculating means and a second result obtained by said second calculating means, where A and B are predetermined constants, a result obtained by said third calculating means being used as the weighted average of the white reference data stored in said storage means and the image data.

15. A white reference data generating unit as claimed in claim 13, wherein said inhibition means has substitution mean for substituting the white reference data stored in said storage means for the image data used in said operating means.

16. A white reference data generating unit as claimed in claim 14, wherein said inhibition means has supply means for supplying the white reference data stored in said storage means to said first calculating means instead of the image data.

17. A white reference data generating unit as claimed in claim 10, wherein said storage means has a line memory storing the white reference data by one line.

18. A white reference data generating unit for generating white reference data based on image data which is obtained while an image sensor means is scanning on a white reference plate in a predetermined number of lines, said white reference data being used in a shading correction process, said white reference data generating unit comprising:

storage means for storing white reference data obtained by scanning of the white reference plate;

determination means, coupled to said image sensor means, for determining whether or not the image data supplied from said image sensor means is equal to or less than a threshold level based on data stored as the white reference data in said storage means;

updating means, coupled to said storage means, for updating the white reference data stored in said storage means to new white reference data calculated based on the white reference data stored in said storage means and input data while said image sensor means is scanning each line on said white reference plate; and supply means, coupled to said storage means, said determination means and said updating means, for supplying the image data, as the input data, to said updating means when said determination means determines that the image data is greater than the threshold level, and for supplying difference data, as the input data, to said updating means when said determination means determines that the image data is equal to or less than the threshold level, said difference data being obtained by subtracting a first value from the white reference data stored in said storage means.

19. A white reference data generating unit for generating white reference data based on image data which is obtained while an image sensor means is scanning on a white reference plate in a predetermined number of lines, said white reference data being used in a shading correction process, said white reference data generating unit comprising:

storage means for storing white reference data obtained by scanning of the white reference plate;

determination means, coupled to said image sensor means, for determining whether or not the image data supplied from said image sensor means is equal to or less than a threshold level based on data stored as the white reference data in said storage means;

updating means, coupled to said storage means and said image sensor means, for updating the white reference data stored in said storage means to new white reference data calculated based on the white reference data stored in said storage means and the image data supplied from said image sensor means while said image sensor means is scanning each line on said white reference plate; and inhibition means, coupled to said determination means and said updating means, for inhibiting said updating means from updating the white reference data stored in said storage means when said determination means determines that the image data supplied from said image sensor means is equal to or less than the threshold level.

* * * * *